J. H. BURTIS.
Fly-Traps.
No. 158,623.  Patented Jan. 12, 1875.
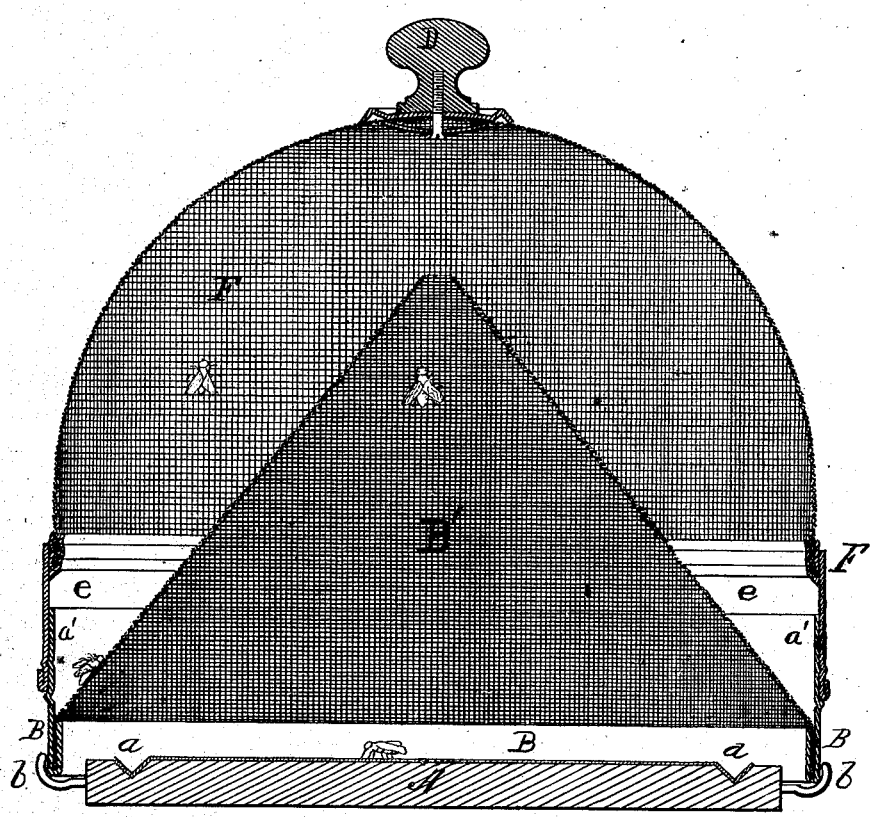
WITNESSES
E. H. Bates
F. J. Masi
INVENTOR
Jacob H. Burtis
Attorneys

UNITED STATES PATENT OFFICE.

JACOB H. BURTIS, OF EL PASO, ILLINOIS.

IMPROVEMENT IN FLY-TRAPS.

Specification forming part of Letters Patent No. 158,623, dated January 12, 1875; application filed June 20, 1874.

*To all whom it may concern:*

Be it known that I, JACOB H. BURTIS, of El Paso, in the county of Woodford and State of Illinois, have invented a new and valuable Improvement in Fly-Traps; and I do hereby declare that the following is a full, clear, and exact description of the construction and operation of the same, reference being had to the annexed drawings, making a part of this specification, and to the letters and figures of reference marked thereon.

The figure of the drawing is a representation of a sectional view of my fly-trap.

This invention has relation to fly-traps, wherein are employed a feed-board, an inner conical chamber, and an outer wire receptacle, into which flies pass from the inner chamber, where they are effectually trapped; and the novelty consists in a novel construction and arrangement of the parts, as will be hereinafter more fully described and claimed.

In the annexed drawings, A designates a circular wooden feed-board, having a deep groove, a, constructed around the edges of its upper surface, wherein is received and prevented from overflowing any excess of baiting material which may have been placed thereon. b designates hooked arms, which are radially applied around the periphery of the feed-board A, above its base, at a suitable distance apart, with their hooked portions upward, for the purpose of receiving the lower edge of an annular base, B, of which the lower portion is bent over and inward, to afford a seat for a conical upper portion, B', of wire-cloth, into which seat the said upper portion is then rigidly secured by soldering. The upper portion of the base B is extended upward beyond its junction with its base, to afford a surface, on which is applied the foundation or base of an outer cage or chamber, hereinafter to be explained. The apex of this inner chamber is perforated, as shown in figure, to admit of flies penetrating therefrom to a conoidal outer chamber, F, composed of wire cloth, and having an annular metal base, e, of which the diameter is slightly greater than that of the extended surface a' of the base B, to permit of its being removably seated thereon. Upon the upper surface of the outer cage I have caused to be applied a handle, D, by means of which the said cage is conveniently used.

I use my improved fly-trap in the following manner: I spread upon the feed-board A a piece of paper or cloth, upon which has been applied a suitable saccharine baiting-substance, and then place the inner chamber over the said feed-board, and the outer cage or chamber upon its seat on the base of the said inner chamber, when flies will be attracted by the bait upon the feed-board through the space between the said feed-board and the metallic base B of the inner chamber, and, when clogged, will pass through the apertures in the apex of the inner cage into the outer chamber, when they will be effectually confined.

It will be seen from the above description that, by the use of hooked arms b, for the purpose of receiving the base of the inner chamber, I have secured a greatly-enlarged entrance for flies to the bait upon the feed-board A; also, that, by means of the seat for the upper portion of the inner chamber constructed from the base thereof and soldered thereto, as described, I have obtained a very firm connection of said parts.

It will be seen furthermore, that, owing to the forms of the inner and outer chambers, and of the feed-board, that they can be conveniently nested or packed each with corresponding parts of other traps at little cost and transported to a market with less danger of injury than if transported in form.

What I claim as new, and desire to secure by Letters Patent, is—

In a fly-trap, the combination of a circular feed-board, A, having the radial hooked arms b, bent inward and upward to form a seat for the conical cage B', and the outer cage F having the annular base e overlapping the base B, substantially as shown, and for the purpose set forth.

In testimony that I claim the above I have hereunto subscribed my name in the presence of two witnesses.

JACOB H. BURTIS.

Witnesses:
 GEORGE E. UPHAM,
 H. C. HOLLINGSHEAD.